United States Patent [19]

Sandèn

[11] Patent Number: 4,493,916
[45] Date of Patent: Jan. 15, 1985

[54] METHOD FOR EXTENSION OF POT LIFE IN CURING REACTIONS

[75] Inventor: Roland Sandèn, Tumba, Sweden

[73] Assignee: Forsvarets Forskningsanstalt, Stockholm, Sweden

[21] Appl. No.: 527,517

[22] PCT Filed: Dec. 22, 1982

[86] PCT No.: PCT/SE82/00437
§ 371 Date: Aug. 18, 1983
§ 102(e) Date: Aug. 18, 1983

[87] PCT Pub. No.: WO83/02282
PCT Pub. Date: Jul. 7, 1983

[30] Foreign Application Priority Data

Dec. 22, 1981 [SE] Sweden .............................. 8107725

[51] Int. Cl.³ .......................................... C08L 75/04
[52] U.S. Cl. .................................... 524/217; 524/218; 524/721; 524/724; 528/52; 528/53
[58] Field of Search ............... 524/217, 218, 721, 724; 528/52, 53

[56] References Cited

U.S. PATENT DOCUMENTS 4,180,643 12/1979 Moss et al. .......................... 528/52

Primary Examiner—Maurice J. Welsh
Attorney, Agent, or Firm—Fleit, Jacobson, Cohn & Price

[57] ABSTRACT

The present invention relates to a method of avoiding a too rapid curing reaction in production processes where a prepolymer is cured, giving an extension of the so-called pot life. By adding a small amount of a compound, whose structural formula comprises the metal-binding part

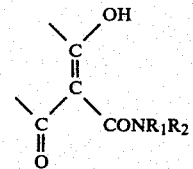

to form complexes with transition metals catalyzing the curing reaction, an extension of the pot life is achieved without any negative influence on the qualities of the produced product. Preferably a tetracycline compound is added.

6 Claims, No Drawings

METHOD FOR EXTENSION OF POT LIFE IN CURING REACTIONS

The present invention relates to production processes where a prepolymer is cured and particularly to a method of avoiding in such processes a too rapid curing reaction, which gives an extension of the so-called pot life.

Solid propellants, so-called composite propellants, for use for instance in rocket and missile propellant charges are pyrotechnical compositions mixed with for instance a thermosetting resin. At the production thereof one starts from a liquid prepolymer, e.g. hydroxy terminated polybutadiene (HTPB) or carboxy terminated polybutadiene (CTPB), which comprises chemically reactive groups and which, after various additions, is crosslinked and cured by means of a curing agent. As part of solid propellants there are often metal comprising additives, e.g. combustion catalysts such as iron oxide and ferrocene compounds.

However, it has been found that transition metals, e.g. iron and copper, even in very small amounts catalyze the curing reaction, and because of this they shorten in a grave way the so-called pot life, i.e. the time that you have at your disposal to mix and cast the composition before it turns too viscous.

Thus, the metal comprising additives that are added for instance to catalyze the combustion of the produced propellant have because of this as a side-effect that they might heavily shorten the pot life, sometimes so heavily that a production in larger scale turns out to be impossible.

The present invention relates to a method that will eliminate said difficulty. The characteristics of the invention are evident from the subsequent patent claims.

According to the invention there is added in the mixing process a very small amount of a compound, the structural formula thereof comprising the metal binding part

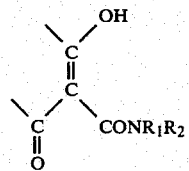

wherein each of $R_1$ and $R_2$ is hydrogen or a hydrocarbon group, for instance a tetracycline compound, to form complexes with the transition metals that are present in the mixture. As a result thereof the pot life will become considerably extended in the production of the propellant without the combustion of the produced propellant being influenced in a negative way.

Very small amounts of the metal complex forming component are required. Suitably there is added between 0 and 3 weight percent based on the produced propellant. Preferably there are used so small amounts as 0.05–1 weight percent.

Certain types of solid propellants comprise metals, e.g. magnesium or aluminium, to increase the energy content. However, this will also cause a heavy intensification of the activity of the combustion catalysts as curing catalysts, causing difficulties in the production. Even in this case the method according to the invention has a favourable effect. It removes the negative influence of the metal on the curing course of reaction, and long pot lifes will again be obtained.

The invention is generally applicable in production processes, where a prepolymer is being cured and where there is a wish to remove the undesirable catalytic action of the transition metals present on the curing reaction, for instance in the production of plastic-bound explosives or other types of encapsulation in plastic.

The method of the invention is also applicable in all polyurethane productions where a hydroxy comprising prepolymer is mixed with a multivalent isocyanate. An undesirable metal catalysis of the curing reaction might occur here because metals will contaminate the source chemicals during the production and storage thereof in metal vessels. Metals will also enter at the actual polyurethane production from the apparatus which is usually made from metal. It is difficult to get control over the metal contamination which often varies with the varying production batches. The metal contamination disturbs both the production process and the following utilization; the shelf life is influenced among other things.

Such undesirable metal catalysis of the curing reaction is prevented according to the invention by adding before the curing a small amount of a compound, whose structural formula comprises the metal-binding part

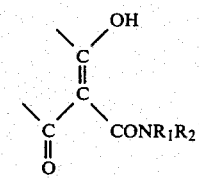

wherein each of $R_1$ and $R_2$ is hydrogen or a hydrocarbon group.

Tetracycline is an example of such a compound that is useful in the method according to the invention to form complexes with transition metals present. Tetracycline, being a wellknown antibiotic, belongs to a group of structurally similar, biologically active compounds. Their chemical structure is

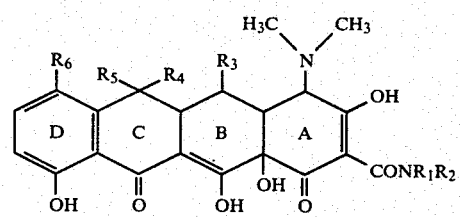

wherein each of $R_1$ and $R_2$ is hydrogen or a hydrocarbon group, $R_3$ is hydrogen or hydroxy, $R_4$ is hydrogen or hydroxy and $R_5$ is hydrogen or lower alkyl or $R_4$ and $R_5$ together is $CH_2$, and $R_6$ is hydrogen, chloro or lower alkylamino.

The simpliest compound of the group is tetracycline, where $R_1=R_2=R_3=R_6=H$, $R_4=OH$ and $R_5=CH_3$. Examples of other compounds of the group are 7-chlorotetracycline and 5-hydroxytetracycline.

The other tetracyclines can also be used in the method of the invention, for instance
5a(6)-anhydrotetracycline
α-apo-5-hydroxytetracycline 7-chloro-5a(11a)-dehydrotetracycline
dedimethylaminotetracyline
6-demethyl-6-deoxy-9-aminotetracycline
6-demethyl-6-deoxy-9-nitrotetracycline
12a-deoxytetracycline
isotetracycline
tetracycline methiodide
mepicycline
penimepicycline
rolitetracycline
lymecycline
doxycycline
tetracyclinonitrile
aminomethylated tetracyclines
HCl-analoges of tetracyclines The structure is such that there are good possibilities for metal complex formation, and the antibiotic activities of the compounds are considered to depend on their metal binding ability.

Several investigations of the complex formation by different metals with tetracycline have been performed, see for instance Williamson and Everett, J Am Chem Soc 1975, 97(9), 2397–2405. The investigations indicate that the metals are bound in the

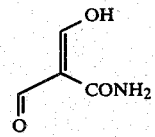

area of ring A and possibly in the

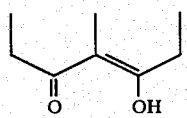

area of ring B and ring C. Consequently said areas are essential parts of the structure.

Tetracycline is common, is easy to get to a moderate price and is very attractive from an occupational hygienic point of view in contrast to those substances that have been used previously to extend the so-called pot life.

Another example of a compound that is useful in the method of the invention is 2-hydroxy-4-methyl-6-ketocyclohexenyl-carboxamide with the formula

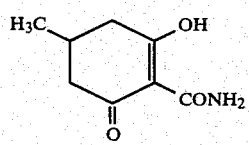

APPLICATION EXAMPLES

EXAMPLE 1

The tests presented in table 1 were carried out in a Brabender plastograph and at a temperature of +58° C. The propellant composition was kneaded until a maximum reading was obtained, which corresponds to a moment of force of 9.8 Nm (=1 kpm). This corresponds to a viscosity of about 1 kPa.s, usually considered to be the limit of castability.

The propellant composition comprised hydroxy terminated polybutadiene (HTPB) of the type ARCO R-45HT, 100 parts, isophorone diisocyanate (IPDI), 10 parts, and ammonium perchlorate up to 85% of the total amount. Moreover, various additives were part of the composition in amounts that are given in the table, where pph is parts per 100 parts of HTPB. Given percentages are weight percent of the total amount.

TABLE 1

Pot life of propellant compositions comprising iron oxide and butylferrocene.

| Tetracycline pph | $Fe_2O_3$ % | Butylferrocene % | Pot life h |
|---|---|---|---|
| — | — | — | 4.8 |
| — | 1 | — | 1.9 |
| 1 | 1 | — | 4.3 |
| 2 | 1 | — | 4.1 |
| — | — | 1 | 0.5 |
| 2 | — | 1 | 5.7 |

Tests were also carried out with other curing agents and with other fillers, giving similar good results.

The presented results show that with tetracycline pot lifes can be obtained for a propellant composition comprising catalysts that are almost as long as the pot life of a pure propellant composition, i.e. a propellant composition that neither comprises combustion catalysts nor any other additives.

It is difficult to find additives that distinctly extend the pot life of a pure propellant composition. Tetracycline on its own has not said effect. However, if one adds tetracycline and a certain type of combustion catalyst, namely a ferrocene compound soluble in the plastic, there is achieved a distinct extension of the pot life, which is evident from table 2 (test F).

TABLE 2

|  | A % | B % | C % | D % | E % | F % |
|---|---|---|---|---|---|---|
| Plastic binder | 30 | 28 | 28 | 27.8 | 28 | 27.8 |
| Ammonium perchlorate | 40 | 70 | 40 | 40 | 40 | 40 |
| Mg-powder | 30 | — | 30 | 30 | 30 | 30 |
| $Fe_2O_3$ | — | 2 | 2 | 2 | — | — |
| Tetracycline | — | — | — | 0.2 | — | 0.2 |
| Tertiary pentylferrocene | — | — | — | — | 2 | 2 |
| Pot life, h | 5.0 | 2.5 | 1.9 | 4.3 | 1.6 | 5.8 |

The intensification of the side-effect of the combustion catalysts as catalyst for the curing reaction, given by magnesium and thus with negative influence on the pot life, is shown in the tests B and C. As is evident from the tests D and F, tetracycline will counterbalance said effect.

EXAMPLE 2

To order to illustrate the positive effect of tetracycline on the pot life when compositions are cured that are not to be considered as solid propellants, plastograph tests were carried out with compositions encapsulating polystyrene granules. The granules were 0.1–0.3 mm. As prepolymer there was used also in this example hydroxy terminated polybutadiene (HTPB) of the type ARCO R-45HT. As curing agent there was used DDI 1410, a diisocyanate from General Mills, USA. The tests were carried out with the Brabender plastograph as before. The temperature was 58.4° C. The metal compound was in this case iron octoate. The results that were obtained are shown in table 3.

TABLE 3

| | Composition, weight percent | | |
|---|---|---|---|
| Plastic binder (R-45HT + DDI) | 30.0 | 29.9 | 29.4 |
| Polystyrene granules | 70.0 | 70.0 | 70.0 |
| Iron octoate | — | 0.1 | 0.1 |
| Tetracycline | — | — | 0.5 |
| Pot Life, h | 2.0 | 0.2 | 1.9 |

The polystyrene is completely neutral as to the curing reaction and may be replaced with any other filler that is neither taking part in the curing processes. All the samples could be heat-treated (+70° C.) into well-cured samples after the plastograph runnings.

EXAMPLE 3

The plastograph experiment was also carried out with HTPB-based propellant compositions that comprised a copper compound instead of an iron compound.

| Binder: | HTPB of the type R-45HT | 100 parts | Temp +58° C. |
|---|---|---|---|
| | BKF | 2 parts | |
| | DDI | 24 parts | |

TABLE 4

| | Composition, weight percent | | | | | |
|---|---|---|---|---|---|---|
| Binder | 30 | 28 | 27.8 | 30 | 28 | 27.8 |
| Mg-powder | — | — | — | 30 | 30 | 30 |
| AP (15 μm) | 70 | 70 | 70 | 40 | 40 | 40 |
| Copper-chromite | — | 2 | 2 | — | 2 | 2 |
| Tetracycline | — | — | 0.2 | — | — | 0.2 |
| Pot Life, h | 4.7 | 4.1 | 4.7 | 5.0 | 3.7 | 4.9 |
| | 4.5 | | | | 3.5 | |

Also here, tetracycline has proved to have a good effect. The effect is weaker than with a Fe-compound present, as the copper chromite has a weaker catalyzing effect on the curing reaction than for instance Fe$_2$O$_3$, but it is still very distinct.

EXAMPLE 4

Carboxy terminated polybutadiene (CTPB) is used as a binder in rocket propellants approximately as HTPB is used. CTPB is usually cured by means of a three-valent aziridine, MAPO. It has been found that MAPO is heavily mutant, and this compound should therefore be avoided. Using certain catalysts, among others and perhaps particularly chromium diisopropylsalicylate (Cr-DIPS), CTPB can be cured by means of polyvalent epoxides. Even here there might arise problems with the pot life, and also here tetracycline is active, as is evident from table 5.

TABLE 5

| | Composition, weight percent | | | | |
|---|---|---|---|---|---|
| HC-434 | 30.5 | 30.3 | 30 | 29.9 | 29.8 |
| Epikote 828 | 3 | 3 | 3 | 3 | 3 |
| Cr-DIPS | 0.5 | 0.5 | 1 | 1 | 1 |
| Tetracycline | — | 0.2 | — | 0.1 | 0.2 |
| PS-granules | 66 | 66 | 66 | 66 | 66 |
| Pot life, h | 1.6 | >5.6 | 0.9 | 1.4 | 2.0 |

In the described tests, CTPB of the type HC-434 was used, and as epoxide there was used a standard product from Shell, Epikote 828. As filler there were used small polystyrene granuales (PS). The compositions were run in the plastograph at 58° C. as previously described.

EXAMPLE 5

In order to illustrate the effect of tetracycline on another type of curing reaction than in the previous examples, namely on a curing reaction of the free radical type, Sylgard 182 was used as polymer, a polysiloxane from Dow Corning available in general commerce, which is cured during the formation of bindings of the type —Si—O—Si— and —Si—CH$_2$—CH$_2$—Si—. The tests were carried out in the plastograph in the same way as previously, except that the temperature was kept at +48° C.

TABLE 6

| | Composition, weight percent | | |
|---|---|---|---|
| Sylgard 182    94 parts | 30 | 28 | 27.8 |
| Curing agent    6 parts | | | |
| Tertiary pentylferrocene (TPF) | — | 2 | 2 |
| Magnesium powder | 50 | 50 | 50 |
| Ammonium perchlorate (15 μm) | 20 | 20 | 20 |
| Tetracycline | — | — | 0.2 |
| Pot life, h | >4 | 2 | >4 |

The samples could be cured into a crosslinked rubber material at an enhanced temperature. From the table there is evident, that the presence of ferrocene makes the composition cure more rapidly and that an addition of tetracycline will again extend the pot life.

I claim:

1. Method to extend the so-called pot life in production processes where a prepolymer is cured and where the curing reaction is catalyzed in an undesirable way by transition metals being present, characterized in that there is added before the curing reaction a compound, whose structural formula comprises the metal-binding part

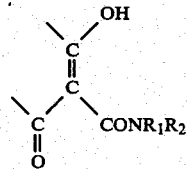

wherein each of R$_1$ and R$_2$ is hydrogen or a hydrocarbon group.

2. Method according to claim 1, characterized in that there are added one or several tetracyclines with the general formula

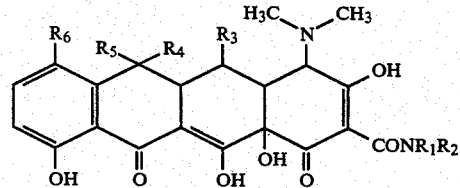

wherein each of R$_1$ and R$_2$ is hydrogen or a hydrocarbon group, R$_3$ is hydrogen or hydroxy, R$_4$ is hydrogen of hydroxy and R$_5$ is hydrogen or lower alkyl or R$_4$ and R$_5$ together is CH$_2$, and R$_6$ is hydrogen, chloro or lower alkylamino.

3. Method according to claim 2, characterized in that there is added tetracycline, 7-chlorotetracycline or 5-hydroxytetracycline.

4. Method according to claim 1, characterized in that there is added the compound 2-hydroxy-4-methyl-6-ketocyclohexenyl-carboxamide with the formula

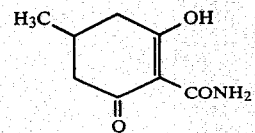

5. A method according to claim 1, wherein the compound added is added in an amount of up to about 3 weight percent based on the product obtained.

6. A method according to claim 5, wherein the compound added is added in an amount of from about 0.05 to about 1 weight percent based on the product obtained.